(12) United States Patent
Audette

(10) Patent No.: US 10,003,749 B1
(45) Date of Patent: Jun. 19, 2018

(54) APPARATUS AND METHOD FOR CLOAKED OUTDOOR ELECTRONIC SIGNAGE

(71) Applicant: Steven Mark Audette, Saint Paul, MN (US)

(72) Inventor: Steven Mark Audette, Saint Paul, MN (US)

(*) Notice: Subject to any disclaimer, the term of this patent is extended or adjusted under 35 U.S.C. 154(b) by 0 days. days.

(21) Appl. No.: 14/789,560

(22) Filed: Jul. 1, 2015

(51) Int. Cl.
    *H04N 5/232*    (2006.01)
    *G06Q 30/02*    (2012.01)
    *G09F 15/00*    (2006.01)

(52) U.S. Cl.
    CPC ..... *H04N 5/23293* (2013.01); *G06Q 30/0241* (2013.01); *G09F 15/0037* (2013.01); *H04N 5/23216* (2013.01)

(58) Field of Classification Search
    CPC ............ H04N 5/23293; H04N 5/23216; G09F 15/0037; G06Q 30/0241
    See application file for complete search history.

(56) References Cited

U.S. PATENT DOCUMENTS

| | | | |
|---|---|---|---|
| 7,098,870 B2* | 8/2006 | Wampler | G06F 3/1438 345/2.1 |
| 8,237,791 B2 | 8/2012 | Chen et al. | |
| 8,711,176 B2 | 4/2014 | Douris et al. | |
| 2002/0044152 A1* | 4/2002 | Abbott, III | G06T 11/00 345/629 |
| 2009/0289955 A1 | 11/2009 | Douris et al. | |
| 2010/0313172 A1* | 12/2010 | Hirahara | G06F 1/3218 715/867 |
| 2011/0115990 A1 | 5/2011 | Bhaktiar | |
| 2013/0260360 A1* | 10/2013 | Baurmann | G06F 3/14 434/365 |
| 2013/0293581 A1* | 11/2013 | Wissner-Gross | G06T 19/006 345/633 |
| 2014/0101575 A1* | 4/2014 | Kwak | G06F 1/1616 715/761 |
| 2014/0204023 A1* | 7/2014 | Kumar | G06K 9/00671 345/156 |
| 2015/0205451 A1* | 7/2015 | Lee | G06F 3/0481 715/766 |

\* cited by examiner

*Primary Examiner* — Gevell Selby
(74) *Attorney, Agent, or Firm* — Berggen Law Offices, LLC; William R. Berggren; Stephen F. Wolf

(57) ABSTRACT

An outdoor electronic signage apparatus configured to display background images for preselected intervals of time. The apparatus may be single sided, double sided, or in a "V" configuration. The apparatus is purposed to decrease billboard blight while it increases active conscious awareness of electronic bill board advertisements. The apparatus comprises outdoor electronic signage device, an electronic data device, and a controller.

14 Claims, 7 Drawing Sheets

APPARATUS AND METHOD FOR CLOAKED OUTDOOR ELECTRONIC SIGNAGE

FIELD OF THE INVENTION

The present invention related generally to an electronic signage device and more particularly to an outdoor electronic billboard.

BACKGROUND OF THE INVENTION

There is a need to enhance the benefit of outdoor electronic signage while addressing the perceived visual nuisance by persons who live near the electronic signage or more generally, persons simply offended by billboard blight.

Outdoor electronic signage has proliferated in recent years. Outdoor electronic signage that is mounted to stationary frames or structures is also known as outdoor electronic billboards. There is an increase in the replacement of traditional outdoor billboards with outdoor electronic billboards. A major reason is the ease of changing the displayed advertising image on the outdoor electronic billboards allowing for multiple advertisements to be displayed during a shorter period of time that may range from during the same day to during a time period extending over several days or weeks. While this increases the revenue earned per billboard, it also increases billboard blight perceived by a growing segment of viewers. In addition, with time, even the outdoor electronic bill boards tend to become stale as the viewers become more jaded with the portrayed images and tune them out more easily from their conscious awareness.

There is a need for outdoor electronic signage to be both more effective by increasing the viewing public's awareness of the images displayed on the outdoor electronic billboard while decreasing the nuisance from perceived billboard blight for a vocal segment of the viewing public.

SUMMARY OF THE INVENTION

This invention addresses that need for outdoor electronic signage to be both more attention grabbing to the general viewing public while being less of a nuisance to an increasingly vocal segment of the viewing public that includes residents who reside near the outdoor electronic billboards and those who drive by them. The invention comprises an apparatus aspect and a method aspect.

The apparatus aspect comprises an outdoor electronic signage device, an electronic data device, and a controller. The outdoor electronic signage device has a front surface and a back surface, and comprises at least one display screen having a front, a back, a front surface, a back surface, and a perimeter. The outdoor electronic signage device also has at least one camera affixed to the display screen and configured to capture an outdoor electronic background image of the scene facing the back of the outdoor electronic signage device at periodic intervals of time. The electronic data device is in communication with the display screen and is configured with at least one electronic informational image that may be conveyed on the front surface of the display screen. The controller is in electronic communication with the camera and the electronic device and configured to replace the electronic informational image on the front surface of the display screen with the outdoor electronic background image at predetermined intervals of time.

The method aspect is a method of cloaking outdoor electronic signage that comprises three steps. The first step providing an apparatus as described above. The second step is programming the electronic data device to convey an electronic informational image on the front surface of the display screen. The third step is programming the controller to replace the electronic informational image with the outdoor electronic background image at predetermined intervals of time.

The invention has at least two benefits. First, because the displayed image appears to periodically disappear or be "cloaked", there is more of an attention-grabbing aspect to the outdoor electronic signage and its electronic advertisements when the cloaking is periodically removed and the electronic image is visible. Second, because the outdoor electronic signage can be timed to "vanish" during days and times of days when few travel, the public would perceive an effort by the billboard owners to partially meet their concerns by lessening the visual nuisance.

BRIEF DESCRIPTION OF THE DRAWINGS

FIG. 5A show the display side of a first displaying apparatus and FIG. 5B shows the display side of a second displaying apparatus.

Figure 1:
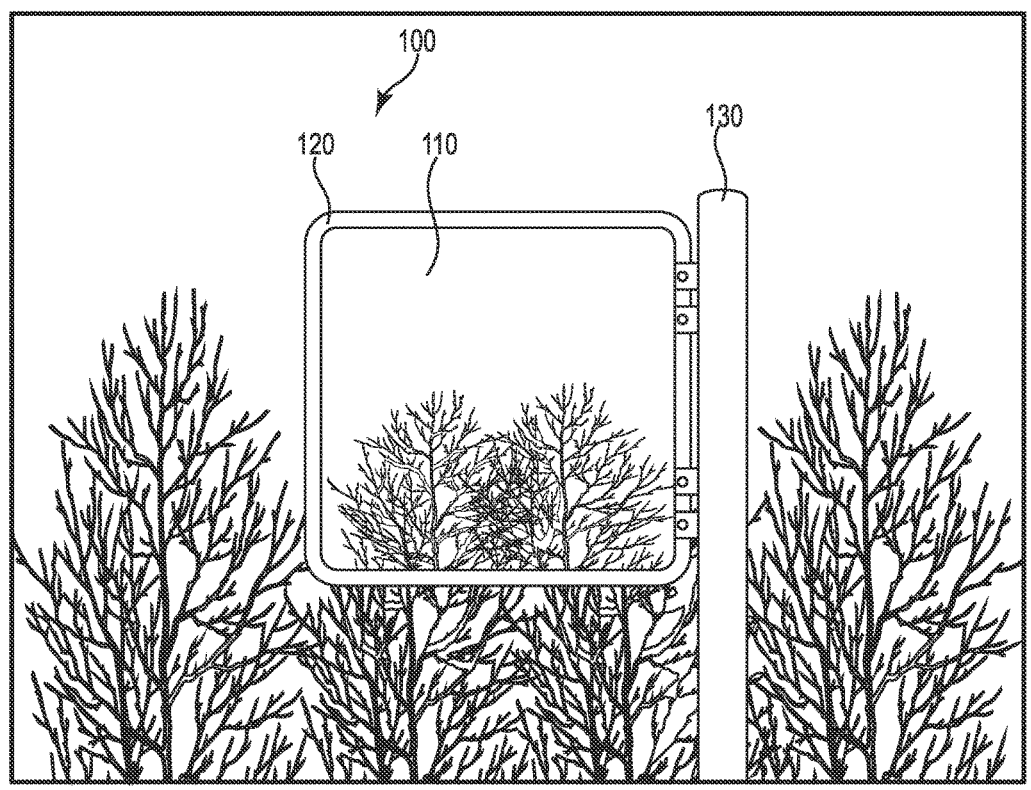
FIG. 1 is an illustration of an embodiment of an apparatus of the invention with the electronic background image being displayed.

While the invention is amenable to various modifications and alternative forms, specifics have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

There is a need to decrease the polarization between the outdoor advertising industry and communities proximate the outdoor advertising. A device and method are needed to improve the viewer active conscious awareness of the image displayed on outdoor electronic signage as well as decrease the perceived nuisance of "billboard blight". Billboard blight is the constant display of outdoor electronic displays, all day and all night, along roadways through scenic terrains that are often rural, residential, or sparsely populated stretches of land that lead to residential neighborhood. The invention offers predetermined intervals of time where the outdoor electronic image appears to be cloaked or invisible to a viewer and intervals of time where the image is visible as intended. Such an intermittent visibility creates a "pop" visibility that increases viewer's active conscious awareness of the displayed outdoor electronic image.

The invention is not a futuristic science fiction space travel type of cloaking. The invention is a use of at least one difficult to detect digital camera on the sign and software that captures the landscape that the sign is blocking as an outdoor electronic background image and uses this captured image as the image that is displayed between the ads. In some embodiments of the invention, the software also blends from one image to the next instead of the very distracting practice used today of an instantaneously switching to a different advertisement. In another embodiment, the software and hardware also may adjust hue, color, and brightness of the displayed outdoor electronic background image to current conditions where outdoor electronic background image is not a live image.

In other embodiments, the apparatus of the invention may be affixed to a support structure that may be wrapped in materials that resemble the color, texture, or appearance of the background to virtually cloak the structure such as, for example, a sign pole. Turning the pole into an evergreen such as an artificial Christmas tree would also prove to be very affective if the location and season permits. In some embodiments, the very small boarder that is typically seen around the perimeter of an outdoor electronic signage could also be further reduced to improve the cloak simulation. This technique is not for every location. Locations that work particularly well are signage that appear with only the sky as their back ground and signage that have a stationary background such as evergreens that are close to the signage, i.e., for example, less than 75 feet. The goal need not be a complete undetectable cloak but a significantly less distracting one.

This invention can also utilize two of the advertising industries' greatest adverse practices in a non-adverse way. First, subliminal messaging can be used to convey safe practices such as, for example, "Do not text while driving" and "fasten your seat belts". Second, live video that are generally banned as an advertising format for outdoor electronic signage because of drive distraction may be used on outdoor electronic signage on our freeways to convey more realistic background images that present a cloaked of invisible effect.

The outdoor advertising industry that wants to use outdoor electronic signage, the communities that have or are desired to have outdoor electronic signage, and the advertising agencies that want additional customers who are leery of current outdoor electronic signage may all benefit with the invention. The outdoor advertising industries are presently encountering community resistance to outdoor electronic signage because their hardware broadcasts 24 hours a day, 7 days a week, 52 weeks a year, i.e., continuously. It also lessens the billboard blight effect if the signage remains cloaked for extended periods of time such as when viewership is low. The invention permits people who manage the electronic billboard to cloak the advertisements for various predetermined time intervals between advertisements or even cloaking certain times of the day such as, for example, Sunday mornings and some hours during the middle of the night.

These unique advertising experiences would tend to increase active conscious awareness of the advertisement experience for the viewers. This would increase the value of the advertisements to the buyers of the advertisements and revenue to the advertising industry.

The value to communities may increase. Decreasing the time of continuous display likely would improve relationships between the advertisers and the communities by making them less adversarial. This improvement may lead to use of the outdoor electronic signage for short community announcements on the order of, for example, a few minutes each hour or for irregularly timed emergencies. Community announcements could comprise such things as, for example, "time/temp/county" or "its dusk turn your car lights on and watch for deer", or emergency announcements such as a missing person or tornado watch. There a number of mutually beneficial things the billboard companies and communities could do using this technique and the dialog that it'll create to get past their current often adversarial relationship.

The value to advertising agencies lies in the uniquely different manner of conveying outdoor electronic advertisements. Advertising agencies are frequently looking for a way to make their advertisements stand out, i.e., by use of 3D signage. They are willing to pay more for a result that increases the active conscious awareness of an increasingly more jaded consumer base without turning off communities where the outdoor electronic signage is located. Advertisements that seem to appear out of thin air may be such a presentation. Furthermore, many companies do not engage in outdoor adverting because they do not want to be perceived by customers as adding to the billboard blight. This invention could attract some of those companies to use of electronic billboards.

The apparatus aspect of the invention comprises an outdoor electronic signage device, an electronic data device, and a controller. The outdoor electronic signage device has a front surface and a back surface, and comprises at least one display screen having a front, a back, a front surface, a back surface, and a perimeter, and at least one camera affixed to the display screen and configured to capture an outdoor electronic background image of the scene facing the back of the outdoor electronic signage device at periodic intervals of time. The electronic data device is in communication with the display screen and is configured with at least one electronic informational image that may be conveyed on the front surface of the display screen. The controller is in electronic communication with the camera and the electronic device and configured to replace the electronic informational image on the front surface of the display screen with the outdoor electronic background image at predetermined intervals of time.

The outdoor signage device is one that is constructed to generally withstand the elements of weather. The display is typically active during the daytime or might time and during fair weather conditions or inclement weather conditions.

The camera may be on the front or back of the display screen as long as the image captured is of that seen by the back of the display screen, i.e., the image that would be visible from one in front of the display screen if the screen were not present. Since the apparatus of the invention is mounted on a stationary support, such an image is generally a one of a landscape. In embodiments where two screens are back to back, the one or more cameras in the front of one screen provides the background images for the other and vice versa.

The periodic intervals of time that the camera is configures to capture an outdoor electronic background image varies. In some embodiments, the outdoor electronic background image is live and the periodic time interval may be between 1 second and 60 seconds. In some embodiments, the image is live and the periodic time interval is zero because the image is continuous. In some embodiments, the image is from a different time or day and altered in the controller as discussed below.

The electronic device is configured to supply the informational electronic image that is paid for by a customer. In some embodiments, software is used to phase out old images and phase in a new image.

The controller is configures to transfer the outdoor electronic background image to the display surface in place of the information al image at predetermined intervals of time. The time intervals may be for a few seconds, a few minutes or for many minutes in a regular pattern or an irregular pattern. In some embodiments, this outdoor electronic background image can be used for 5-8 seconds between advertisements to create the effect of the entire sign disappearing or it can be used to hide the sign for a longer period of time that a local municipality has dictated in exchange for allowing the sign to be erected and used. In some circumstances, the predetermined time interval may be unique to a time frame such as during emergency announcements in place of background images. In some embodiments, the predetermined time interval may be up to 6 hours or longer as, for example, when displaying an electronic background image for a part of a day such as, for example, Sunday mornings or times during the night. In some embodiments, the controller may be configured to also convey public service announcements such as discussed above instead of outdoor electronic background images.

The electronic device and controller each receive their information in various ways that may be the same or different for each. Some embodiments have the information programmed into each. Some embodiments receive information to be displayed and timing instructions through portable storage media such as, for example, digital video disks or flash drives. Some embodiments receive their information wirelessly from remote computing devices where the communication uses more security than that used for the former information transfer systems. In some embodiments, the electronic device and the controller are in the same unit. In some embodiments the electronic device and the controller are in different units.

In some embodiments, the controller may be configured to alter the electronic background image to allow it to more nearly match the actual background image in real time. One scenario where this would be useful, for example, is when the predetermined time interval is several hours in the daytime. In this embodiment, the controller may be configured to alter the hue, color, contrast, and other image features to better replicate the real time background.

The following figures depict various embodiments of the invention to further convey the scope of the invention.

FIG. 1 is an illustration of an embodiment (100) of an apparatus of the invention in cloaking mode with the electronic background image being displayed. Embodiment 100 comprises a display screen (110) within a perimeter (120). Apparatus is supported with a structure (130).

Figure 2:
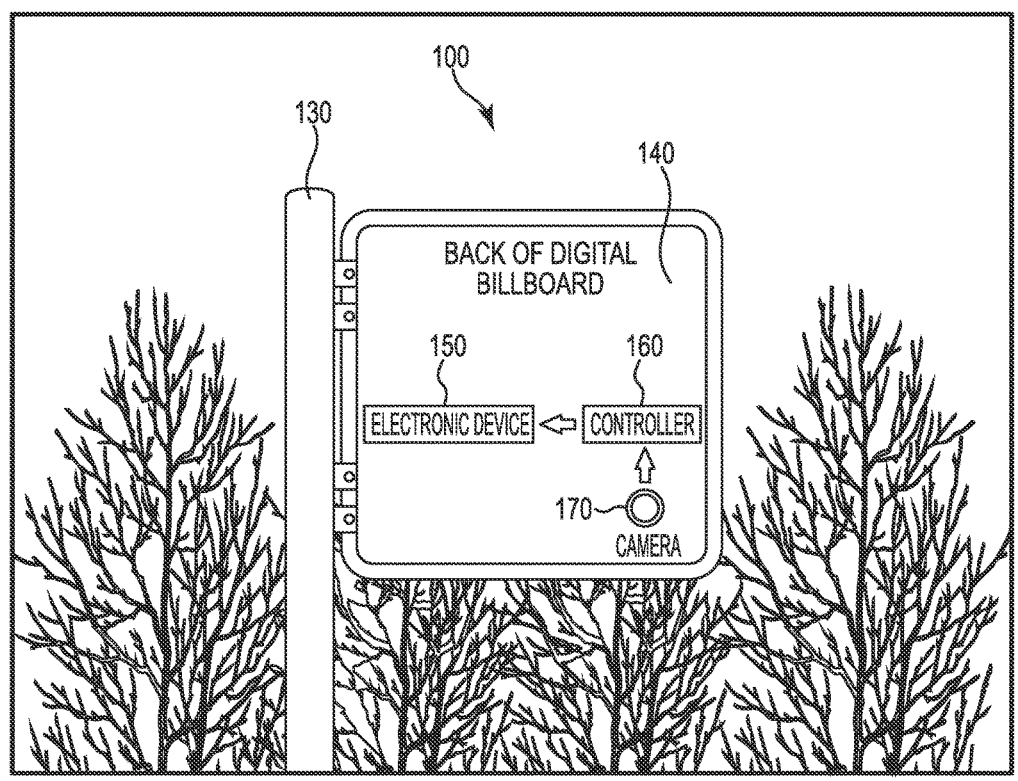
FIG. 2 is an illustration of the back of the embodiment shown in FIG. 1.

FIG. 2 is an illustration of the back (140) of the embodiment shown in FIG. 1. Affixed to back 140 of apparatus 100 is an electronic data device (150) that sends electronic image to the display screen on the other side. A controller (160) is in communication with electronic data device 150 to adjust display time of background and optionally messaging alternatives to paid client advertisements. A camera (170) is in communication with the controller to send background images at predetermined times. Apparatus 100 is attached to support 130

Figure 3:
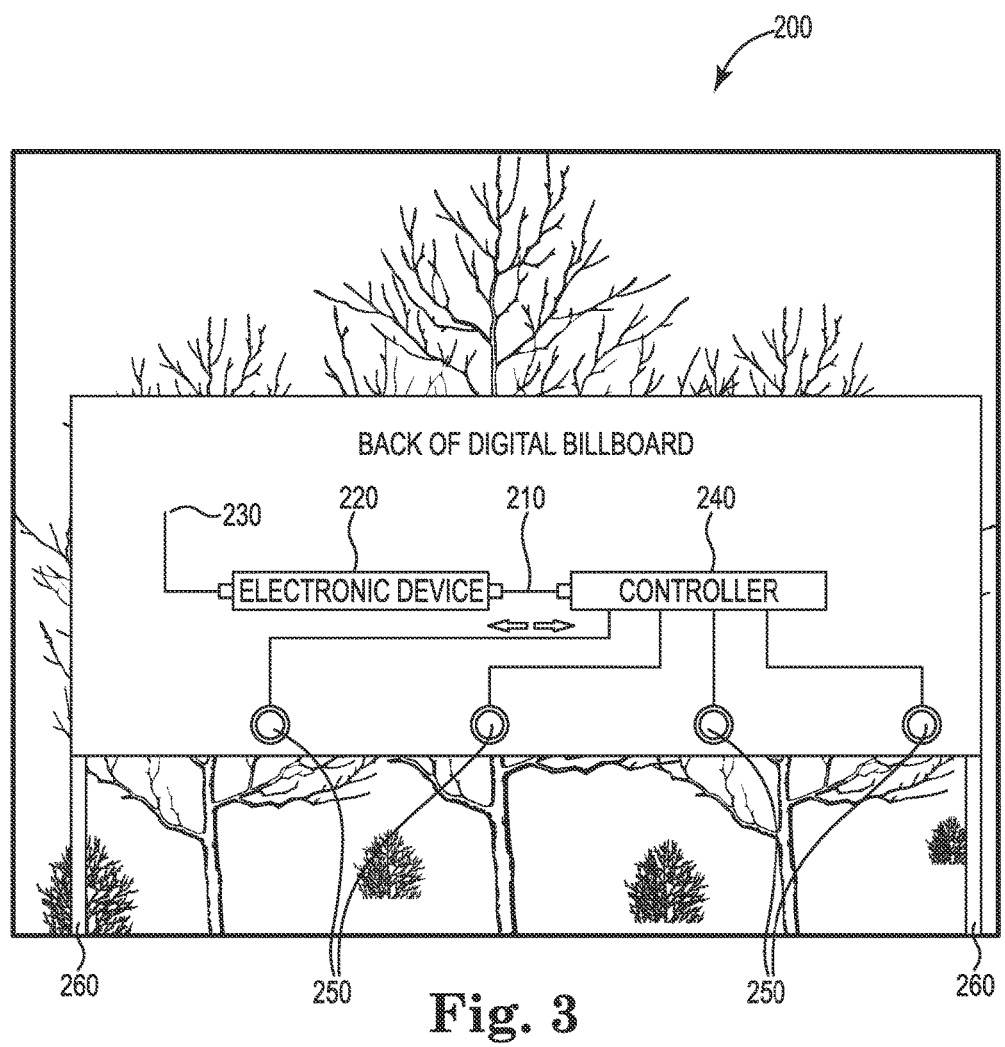
FIG. 3 is an illustration of another embodiment of the back of an embodiment of the invention.

FIG. 3 is another illustration of a second embodiment of the back of an embodiment of an apparatus of the invention. Affixed to the apparatus (200) is a back (210). An electronic data device (220) is in communication with the display screen on the other side by a connector (230). A controller (240) is in communication with electronic data device 230. Four cameras (250) are in communication with controller 230. Apparatus 200 has two supports 260.

Figure 4:
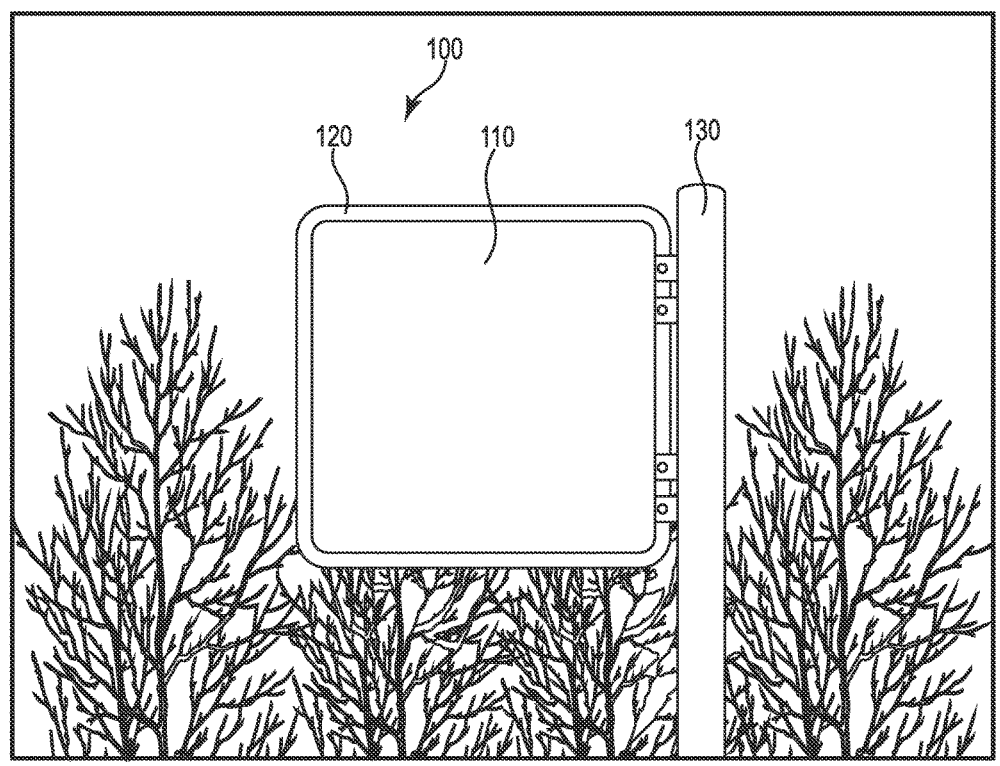
FIG. 4 is an illustration of the embodiment shown in FIG. 1 with the electronic image being replaced with just white noise.

FIG. 4 is an illustration of the embodiment shown in FIG. 1 in uncloaked mode with the electronic image being replaced with just white noise where the advertisement would be. As stated previously, in this illustration, apparatus 100 is held up by support 130. Display screen 110 is shown as a blank square where an electronic advertisement image would be depicted.

In some embodiments, the apparatus further comprises a first and a second display screens facing away from each other in a back to back arrangement. The back surface of the outdoor electronic signage device for the first display screen is the front of the second display screen and the back surface of the outdoor electronic signage device for the second display screen is the front of the first display screen.

Figure 5A:
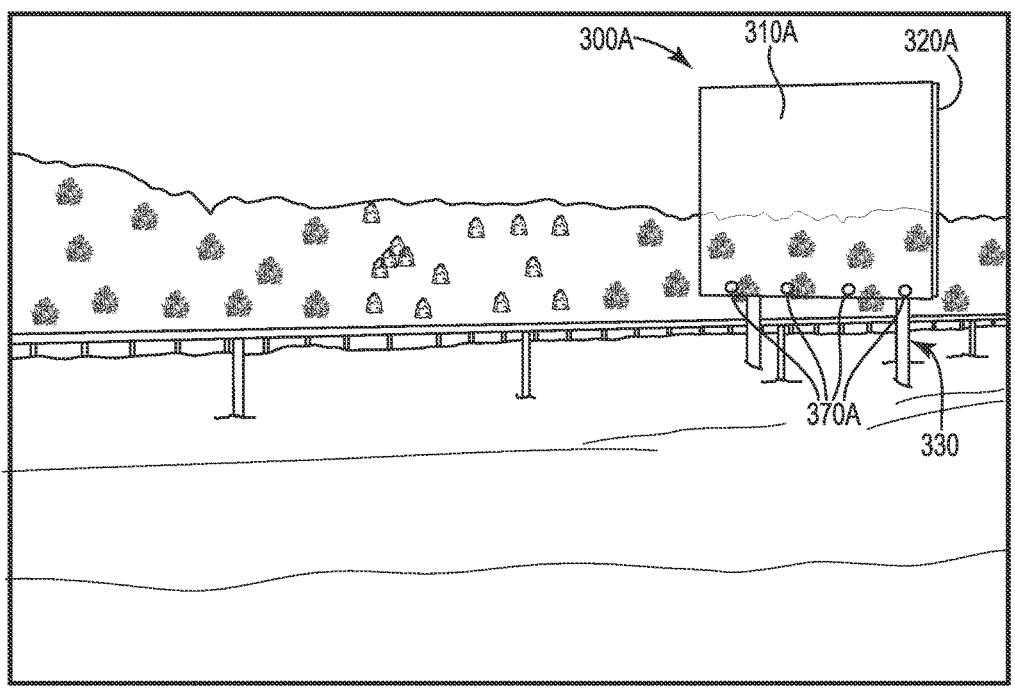
FIGS. 5A and 5B are illustrations of an embodiment of the invention in cloaked mode with two displaying apparatuses in a back to back arrangement.
Figure 5B:
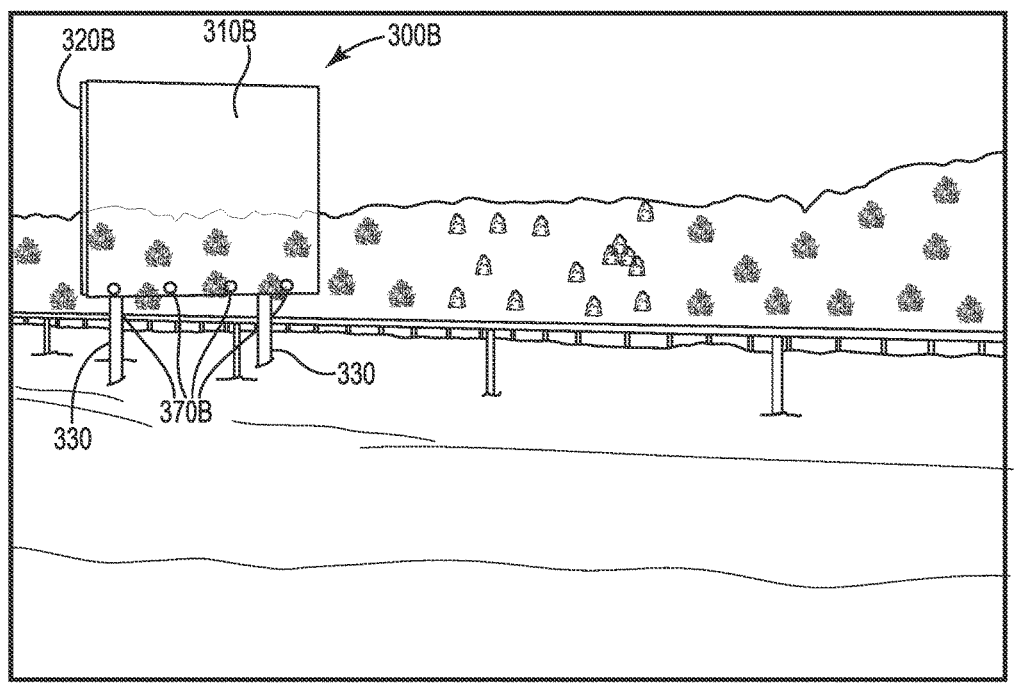

FIGS. 5A and 5B are illustrations of another embodiment of an apparatus of the invention in cloaked mode with two displaying apparatuses in a back to back arrangement. FIG. 5A shows the one display side of the first apparatus (300A) with a display screen (310A), a display screen perimeter (320A), and an apparatus support (330). The image displayed on the display screen is that of the scene behind that display screen as seen through cameras (370B). FIG. 5B shows the display side of the second apparatus (300B) with a display screen (310B), a display screen perimeter (320B), and an apparatus support (330). The image displayed on the display screen is that of the scene behind that display screen as seen through cameras (370A).

In some embodiments, the apparatus of the invention further comprise a first and a second display screens in a "V" formation as viewed from the top with a vertical plane equally positioned between each display screen. The back surface of the outdoor electronic signage device for the first display screen is the front of the second display screen, the back surface of the outdoor electronic signage device for the second display screen is the front of the first display screen and the outdoor electronic background image is configured to be the background scene in the outward direction perpendicular from the plane and not perpendicular from the display screen.

Figure 6:
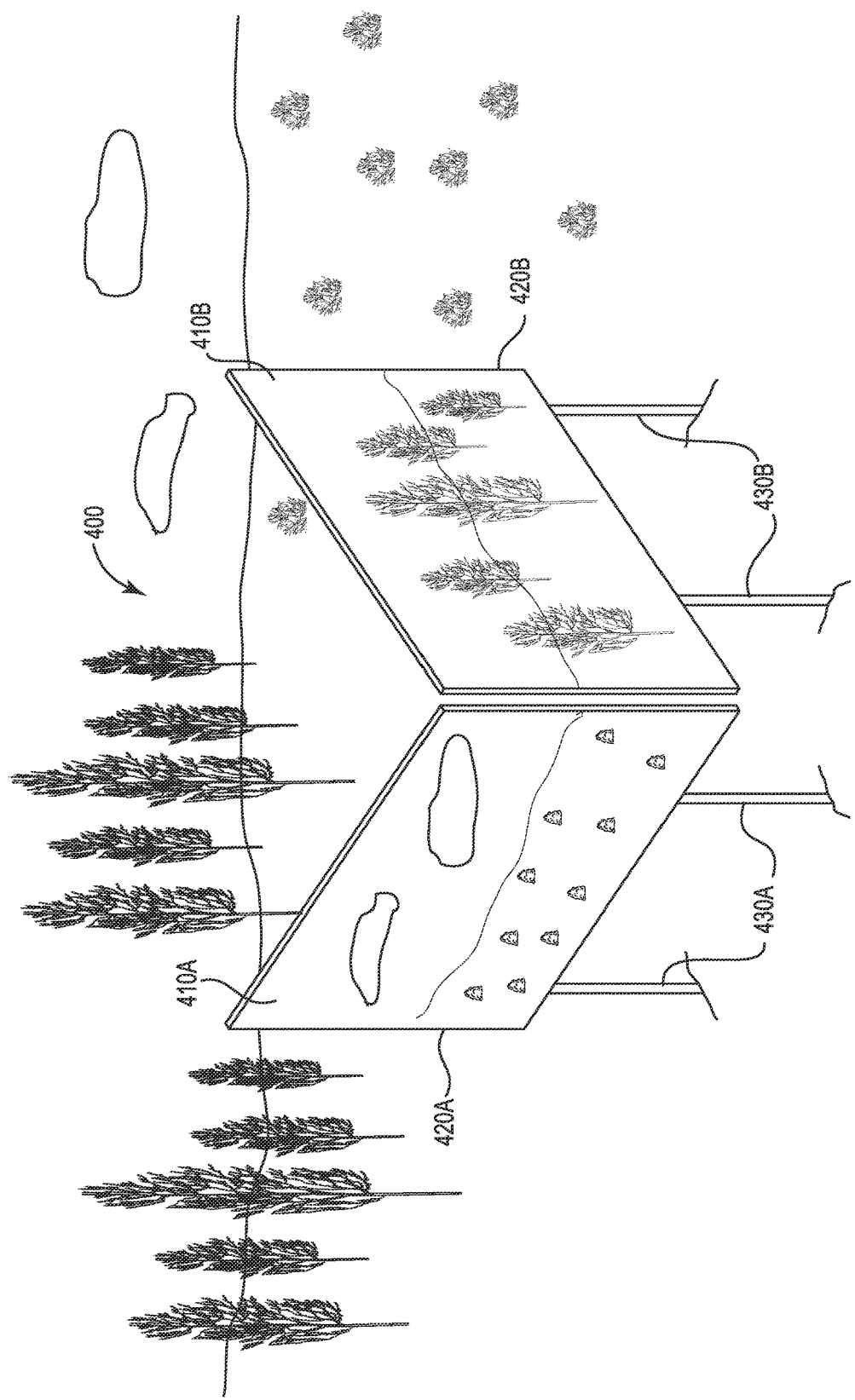
FIG. 6 is an illustration of an embodiment of an apparatus of the invention with two display screens are in a "V" configuration.

FIG. 6 is an illustration of another embodiment of an apparatus of the invention with two display screens that are in a "V" configuration and in a cloaked mode. The apparatus (400) is shown with a first display screen (410A), a first display screen perimeter (420A), and a first apparatus support (430A). The image displayed on the display screen is that of the outdoor scene behind that display screen as seen by at least one camera (not shown) as though no apparatus was present. Apparatus 400 also is shown with a second display screen (410B), a second display screen perimeter (420B), and a second apparatus support (430B). The image displayed on the display screen is that of the outdoor scene behind that display screen as scene by at least one camera (not shown) as though no apparatus was present.

The apparatus may be affixed to various support structures. Support structure for the apparatus may vary. In some embodiments, the support structure is a stationary structure that raises the apparatus to a position that is more viewable by a targeted audience. In some embodiments, the apparatus is affixed to the ground that acts as a support structure.

The method aspect is a method of cloaking outdoor electronic signage that comprises three steps. The first step providing an apparatus as described above. The second step is programming the electronic device to convey an electronic informational image on the front surface of the display screen. The third step is programming the controller to replace the electronic informational image with at least the outdoor electronic background image at predetermined intervals of time.

Other modifications and changes made to fit particular operating requirements and environments will be apparent to those with ordinary skill in the art. Thus, the invention is not considered limited to the embodiments discussed for purposes of disclosure and covers all changes and modifications that do not constitute departures from the true spirit and scope of this invention.

What is claimed is:

1. An apparatus comprising:
    an outdoor electronic signage device with a front surface and a back surface, the electronic signage device comprising:
        at least one display screen having a front, a back, a front surface, a back surface, and a perimeter, and
        at least one camera affixed to the display screen and configured to capture an outdoor electronic background image of the scene facing the back of the outdoor electronic signage device at periodic intervals of time;
    an electronic data device with an electronic informational image in communication with the display screen to convey the informational image on the front surface of the display screen; and
    a controller in electronic communication with the camera and the electronic device and configured to replace the electronic informational image on the front surface of the display screen with the outdoor electronic background image at a predetermined interval of time, wherein the electronic background image is a live image and the predetermined time intervals are from about 1 second to about 60 seconds.

2. The apparatus of claim 1, wherein the predetermined time interval is from about 5 to about 8 seconds.

3. The apparatus of claim 1 comprising a first and a second display screen, each display screen-facing away from the other in a back to back arrangement, the back surface of the first display screen is the front of the second display screen, and the back surface of the second display screen is the front of the first display screen.

4. The apparatus of claim 1 comprising a first and a second display screen in a "V" formation as viewed from the top with a vertical plane equally positioned between each display screen, the back surface of first display screen is the front of the second display screen, the back surface of the second display screen is the front of the first display screen, and the outdoor electronic background image is configured to be the background scene in the outward direction perpendicular from the plane and not perpendicular from the display screen.

5. The apparatus of claim 1, wherein the apparatus is affixed to a stationary structure.

6. The apparatus of claim 1, wherein in the outdoor electronic signage device comprises an outdoor electronic billboard.

7. A method of cloaking outdoor electronic signage comprising:
    providing an apparatus comprising:
        an outdoor electronic signage device with a front surface and a back surface, the outdoor electronic signage device comprising at least one display screen having a front, a back, a front surface, a back surface, and a perimeter; and
        at least one camera affixed to the display screen and configured to capture an electronic background image of the scene facing the back of the outdoor electronic signage device at periodic intervals of time;
        a electronic device with an electronic informational image in communication with the display screen and configured to convey the informational image onto the front surface of the display screen; and
        a controller in electronic communication with the camera and the electronic device and configured to replace the electronic informational image with the outdoor electronic background image at predetermined intervals of time;
    programming the outdoor electronic device to convey an electronic informational image on the front surface of the display screen; and
    programming the controller to replace the electronic informational image with the outdoor electronic background image at predetermined intervals of time,
the wherein the predetermined time intervals are from about 1 to about 60 seconds.

8. The method of claim 7, wherein the electronic background image is a live image and the predetermined time intervals is are from about 5 to about 8 seconds.

9. The method of claim 7 comprising a first and a second display screens facing away from each other in a back to back arrangement, the back surface of the first display screen is the front of the second display screen, and the back surface of the second display screen is the front of the first display screen.

10. The method of claim 7, wherein the apparatus is affixed to a stationary structure.

11. The method of claim 7, wherein the outdoor electronic signage device comprises an outdoor electronic billboard.

12. The method of claim 7, wherein the programming the controller further involves making adjustments as needed to the outdoor background image to more closely match the actual background image at the time of projection onto the screen.

13. The method of claim 7, wherein the controller is configured to alter the hue, color, and contrast of the display screen.

14. The method of claim 7, wherein the electronic background image comprises a live image.

* * * * *